Oct. 19, 1971  F. SCHNEIDER ET AL  3,613,311
DEVICE FOR OPENING AND CLOSING SLIDING ROOF SECTIONS
OF A FREIGHT CAR
Filed May 15, 1969  5 Sheets-Sheet 1

INVENTORS:
FELIX SCHNEIDER
PAUL-WERNER WAGENER
ERNST NEUSER
RUDOLF WALSER by *McGlew & Toren*
ATTORNEYS.

Oct. 19, 1971   F. SCHNEIDER ET AL   3,613,311
DEVICE FOR OPENING AND CLOSING SLIDING ROOF SECTIONS
OF A FREIGHT CAR
Filed May 15, 1969   5 Sheets-Sheet 5

INVENTORS
FELIX SCHNEIDER
PAUL-WERNER WAGENER
BY ERNST NEUSER
RUDOLF WALSER

McGlew & Tuttle
ATTORNEYS

# 3,613,311
Patented Oct. 19, 1971

3,613,311
DEVICE FOR OPENING AND CLOSING SLIDING ROOF SECTIONS OF A FREIGHT CAR
Felix Schneider, Eckmannshausen, Paul-Werner Wagener, Netphen (Sieg), and Ernst Neuser, Dreis-Tiefenbach, Germany, and Rudolf Walser, Jegenstorf, Switzerland, assignors to Rheinstahl Siegener Eisenbahnbedarf G.m.b.H., Dries-Tiefenbach Kreis Siegen I.W., Germany
Filed May 15, 1969, Ser. No. 824,841
Claims priority, application Germany, May 18, 1968, P 17 59 609.7
Int. Cl. E05f *11/04*
U.S. Cl. 49—136                            9 Claims

ABSTRACT OF THE DISCLOSURE

In a device for opening and closing sliding roof sections of containers, such as two-section roofs of freight cars, each roof section is connected by two cables to a respective drum rotatably mounted on a cross connection of a freight car. Each of the two cables is connected to the roof section adjacent a respective end of the latter, and the two cables are wound in opposed directions on the associated drum. Manually operable crank means rotate the drums through transmission means interconnecting the crank means and the drums. Respective clutches are interposed between each drum and the transmission means, and clutch operating means connect the crank means to the clutch means and are operable, responsive to operation of the crank means in a direction to open one roof section, to engage the clutch means connecting the associated drum to the transmission means and to disengage, and maintain disengaged the clutch means interposed between the other drum and the transmission means. When one roof section has been moved to the open position, the other roof section cannot be moved to the open position until the one roof section has been returned to the fully closed position. Continued movement of the crank means in the closing direction for one roof section will, after the two roof sections are in the closed position, initiate opening movement of the other roof section.

BACKGROUND OF THE INVENTION

U.S. patent application Ser. No. 604,287, filed Feb. 28, 1967, now Pat. No. 3,526,194, issued Sept. 1, 1970, discloses apparatus for opening and closing slidable roof sections, such as the roof sections of a railroad freight car having a two-section sliding roof. In the apparatus disclosed in the mentioned copending U.S. application, each roof section is connected by two cables to a drum rotatably mounted on a cross connection of the freight car. Each of the two cables is connected to the associated roof section adjacent a respective end of the latter, and the two cables are wound in opposed directions around an associated drum. Thereby, by rotating the drum, the roof section can be moved between its opened position and its closed position and vice versa. In moving to the opened position, each roof section is initially lifted and slides over the other roof section.

The drums are selectively rotatable, through known transmission means, by means of a manual crank or manual cranks which are mounted at any desired part of the car body. For coupling the drive of the roof section to the opened to the manual crank, a hand operated clutch is provided. This clutch must be adjusted accordingly before rotating the manual crank, so that the particular roof section to be opened is selected by adjustment of the clutch. Chain drive means are provided to interconnect the parts.

While the apparatus shown in U.S. Patent No. 3,526,194 operates satisfactorily in practice, there is always the risk that the person operating the crank may adjust the clutch in the wrong direction or may rotate the crank in the wrong direction. This unnecessarily complicates the operation of opening and closing a selected one of the two roof sections.

SUMMARY OF THE INVENTION

This invention relates to means for opening and closing sliding roof sections of containers, such as two-section roofs of freight cars, and, more particularly, to a novel and improved arrangement which avoids the disadvantages of the prior art and which reduces, to a minimum, the necessary manipulations in opening and closing the roof sections.

Thus, in accordance with the invention, there is connected, between known transmission means, a clutch device which, responsive to rotation of the manual crank, engages the driving element of the roof section to be opened and disengages the driving elements of the other roof section.

A particular advantage of the invention device is that the clutch engages the driving elements of the roof section to be opened only when both roof sections are closed. This is effected by reversal of the direction of rotation of the manual crank, and the clutch is, in effect, locked, from the start of the opening operation to completion of the closing operation. Thus, when the sliding roof section is opened, the then engaged clutch cannot be disengaged by reversal of the direction of rotation of the manual crank, and the then disengaged clutch cannot be engaged by such reversal of the direction of rotation. Thus, the manual crank, for opening of a sliding roof section, needs only to be rotated, by operating personnel, in the indicated direction, and thereby the corresponding clutch is engaged and the desired roof section is shifted in the opening direction. Consequently, interference in the clutch, a bad connection of parts, or a wrong shifting of the clutch and the operating parts are not possible.

An object of the invention is to provide an improved and simplified device for opening and closing sliding roof sections.

Another object of the invention is to provide such a device in which mere rotation of a hand crank automatically selects the roof section to be opened, in accordance with the direction of such rotation.

A further object of the invention is to provide such a device in which, responsive to rotation of a hand crank, a clutch in the driving connections to one roof section is engaged and a clutch in the driving connections to the other roof section is disengaged, with such engagement and disengagement being maintained until the selective roof section has been moved to the opened position and returned again to the closed position.

Still another object of the invention is to provide such a roof section operating device in which an incorrect operation of the driving mechanism is not possible.

For an understanding of the principles of the invention, reference is made to the following description of typical embodiments thereof as illustrated in the accompanying drawings.

DESCRIPTION OF THE PREFERRED EMBODIMENTS

Figure 1:
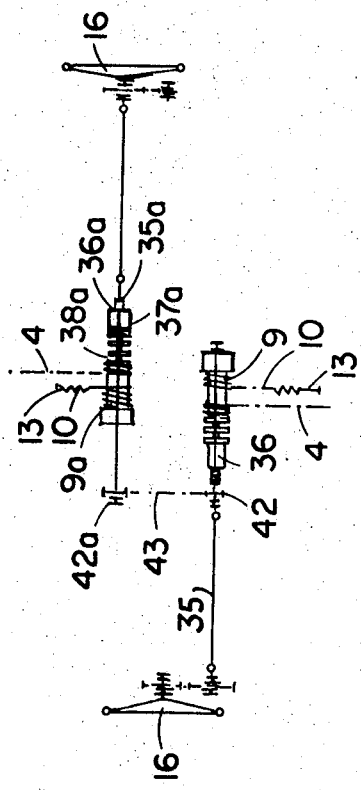
FIG. 1 is a somewhat diagrammatic representation of a device embodying the invention as mounted on a transverse member of a freight car body.
Figure 2:
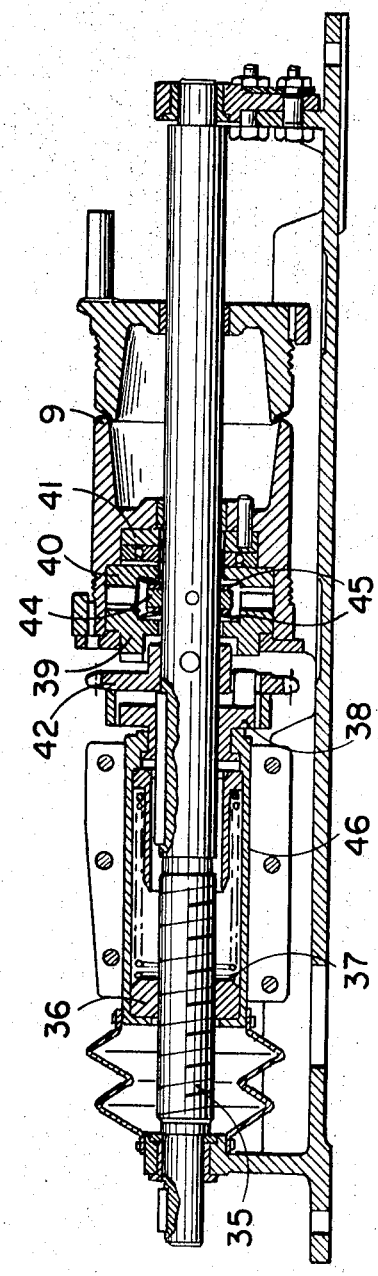
FIG. 2 is a longitudinal or axial sectional view through one embodiment of clutch device in accordance with the invention.

Referring first to FIGS. 1 and 2, each roof section to be opened with the clutch device in accordance with the invention has connected thereto two cables 4 and 10. Each cable 4 is secured to a cross member adjacent the outer end of the respective roof section, and each cable 10 is secured to a cross member adjacent the inner end of the associated roof section, through the medium of a respective spring 13. Through the medium of guide rollers, the two cables 4 and 10 associated with each roof section are connected to a respective drum 9 or 9a rotatably mounted on a cross member of the freight car adjacent the midpoint of the length of the car, the drums 9 and 9a being rotatable about horizontal axes which are perpendicular to the longitudinal axis of the freight car. The cables 4 and 10 are wound in opposed directions on the associated drums so that, upon rotation of the drum, one cable 4 or 10 is unwound and the other cable 10 or 4 is wound, thus displacing the connected sliding roof section longitudinally of the car.

Figure 6:
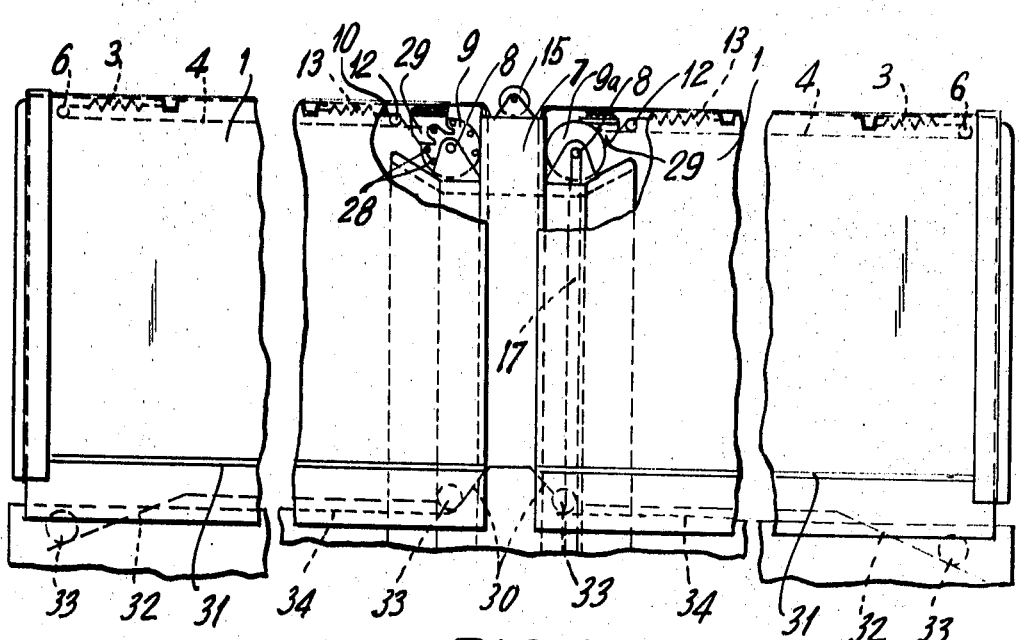
FIG. 6 is a partial side elevation view, partly broken away, illustrating the cross-connection and the two associated roof sections in the closed condition of the roof.
Figure 7:
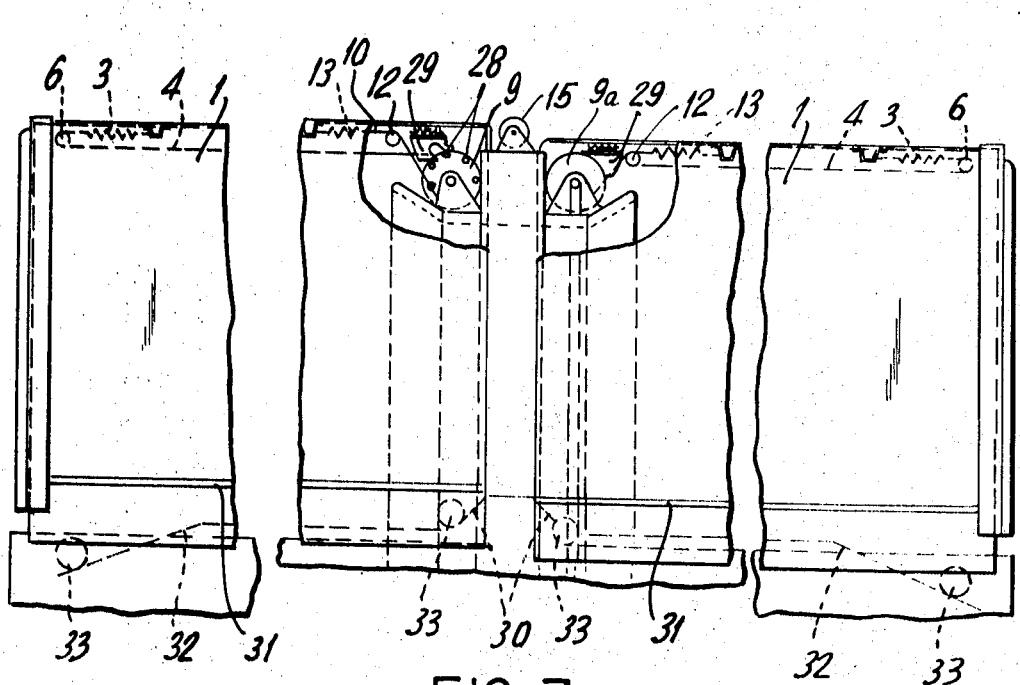
FIG. 7 is a view, similar to FIG. 6, but illustrating the roof sections immediately after the start of an opening operation.

The roof sections are shown in the closed position in FIG. 6 and in the position immediately following the start of the opening of one section, in FIG. 7. In the closed condition of the roof, roof sections 1 extend in the same plane or at the same level, so that the roof section 1 to be opened must first be lifted a certain amount. As best seen in FIGS. 6 and 7, such lifting is effected by cams 28 arranged in circumferentially spaced relation at one end of each cable drum 9 or 9a. These cams are engageable with respective finger bars or plates 29 each secured on the inner side of a respective roof section 1. When the associated cable drum is turned to open the roof section, cams 28 engage beneath the associated finger bar 29 and lift the connected roof section 1 through a distance sufficient for the roof section to move over an inclined surface member 30 on a cross connection and to the level of rails 31 extending along both sides of the other roof section. Such lifting movement is made possible by virtue of the springs 3 connecting each cable section 4 to the associated cross member, since no horizontal movement of the roof section 1 is possible until the roof section has been lifted.

The end of the roof section 1 nearest the associated end wall of the car is also lifted, during longitudinal movement of the roof section, by an inclined surface or ramp 32 and through the necessary distance. As soon as the inner end of the roof section 1 has been lifted a distance sufficient that the finger bar 29 no longer bears on the associated cam 28, this end of the roof section moves on rollers 33, arranged under its inner corners, over the inclined surface 30 and onto rails 31 which are secured on the other roof section. The opposite end of the roof section moves on rails 34 secured on cords of the side walls and which also are formed with inclined end ramps or surfaces 32.

As long as the cable drum is not turned, the associated roof section 1 remains locked in the closed condition by virtue of cams 28 extending through finger bars 29. When a hand crank 16 is locked, with the roof closed, a satisfactory seal, such as, for example a customs seal, for the roof is insured, since cable drum 9 or 9a can be turned only by crank 16.

In the embodiment of the invention shown in FIGS. 1 and 2, the clutch device, forming the subject matter of the invention, is mounted directly adjacent the drum, so as to constitute, with the associated drum, a structural unit which automatically connects the drive elements of their respective sliding roof section to be opened in accordance with the direction of rotation of a manual crank 16. When a crank 16 is rotated, an axle or spindle 35, connected thereto by suitable means, such as gearing, a chain drive, or the like, is rotated so that a non-rotatable nut 36 engaged with a threaded portion of shaft 35 is displaced axially, for example, toward the associated drum 9 when it is desired to open the sliding roof section connected to this drum. Through the medium of a compression spring 37 engaged with nut 9 and with a clutch disk 38, which is axially displaceable but non-rotatably mounted on spindle 35, clutch disk 38 is coupled with clutch disks 39, 40 and 41 mounted on drum 9. By the provision of the compression spring 37, jamming of the claws of clutch disks 38 and 39 is avoided. Upon continued rotation of manual crank 16 associated with drum 9, lifting and longitudinal sliding of the connected roof section takes place in the manner described in the above-mentioned U.S. Pat. No. 3,526,194.

The shaft or spindle 35a operatively associated with the drum 9a is rotated conjointly with shaft or spindle 35 by means of a chain 43 trained over sprocket 42 on shaft 35 and sprocket 42a on shaft 35a. Thus, during opening movement of the sliding roof section connected to drum 9, and which occurs by virtue of the interengagement of the clutch disks, 38, 39, 40 and 41, connecting drum 9 for rotation by shaft 35, shaft 35a is also rotated. However, the rotation of shaft 35a is in a direction such that the nut 36a threaded thereon and held against rotation moves away in an axial direction from the associated drum 9a thus disengaging the clutch disk 38a from the clutch disks connected to the drum 9a. Thus, the clutch device for rotating the drum 9a is uncoupled during opening movement of the sliding roof section connected to the drum 9.

It should be noted that, when the sliding roof sections are closed, the respective nuts 36 and 36a are approximately at the centers of the threaded portions of the respective spindles 35 and 35a, and the path of movement of nuts 36 and 36a corresponds proportionally, in both directions, to the sliding path of the associated sliding roof sections. When nuts 36 and 36a are in their center positions, both clutch devices are uncoupled or are idled. When the sliding roof section connected to drum 9 is open, it may be closed again by reversing the direction of rotation of manual crank 16, so that nuts 36 and 36a return to their central positions. The idling motion or angular play between the claws of clutch disks 38, 39, 40 and 41 makes possible an unhindered falling in of the sliding roof section connected to drum 9 into its closed position. In a particular example illustrated, the idle motion is so designed that he clutch becomes operable to transmit torque only after about three revolutions of spindle 35, corresponding to the same number of revolutions of drum 9. To prevent, during displacement of the sliding roof sections, a slipping forward or leading thereof, for example, when the car is standing on an inclined track, into idling, plate springs 45 are arranged between clutch disks 39 and 40 on both sides of a set ring 44 secured to shaft ring 35. The bearing pressure of these plate springs prevents movement of drum 9 relative to spindle 35.

To open the sliding roof section connected to drum 9a, rotation of hand crank 16 in the direction to close the sliding roof section connected to drum 9 is continued. Due to such continued rotation, nut 36 and, through the housing 46, clutch disk 38 are moved away from clutch disks 39, 40 and 41. Spindle 35a is rotated, through the means previously described including sprockets 42 and 42a and chain 43, so that nut 36a and compression spring 37a act to engage clutch disk 38a with the clutch disks connected to drum 9a. This couples drum 9a for rotation in a direction to open the sliding rof section connected thereto.

Figure 3:
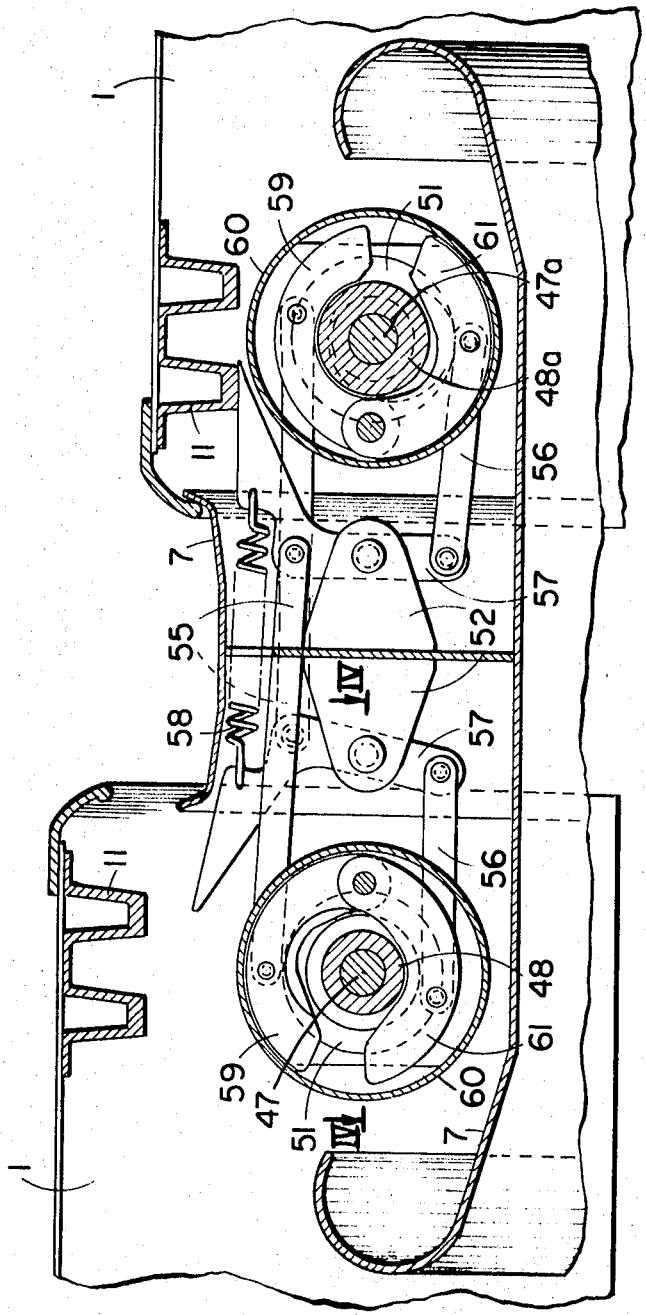
FIG. 3 is a transverse sectional view, taken on the line III—III of FIG. 4, illustrating another embodiment of clutch device in accordance with the invention.
Figure 4:
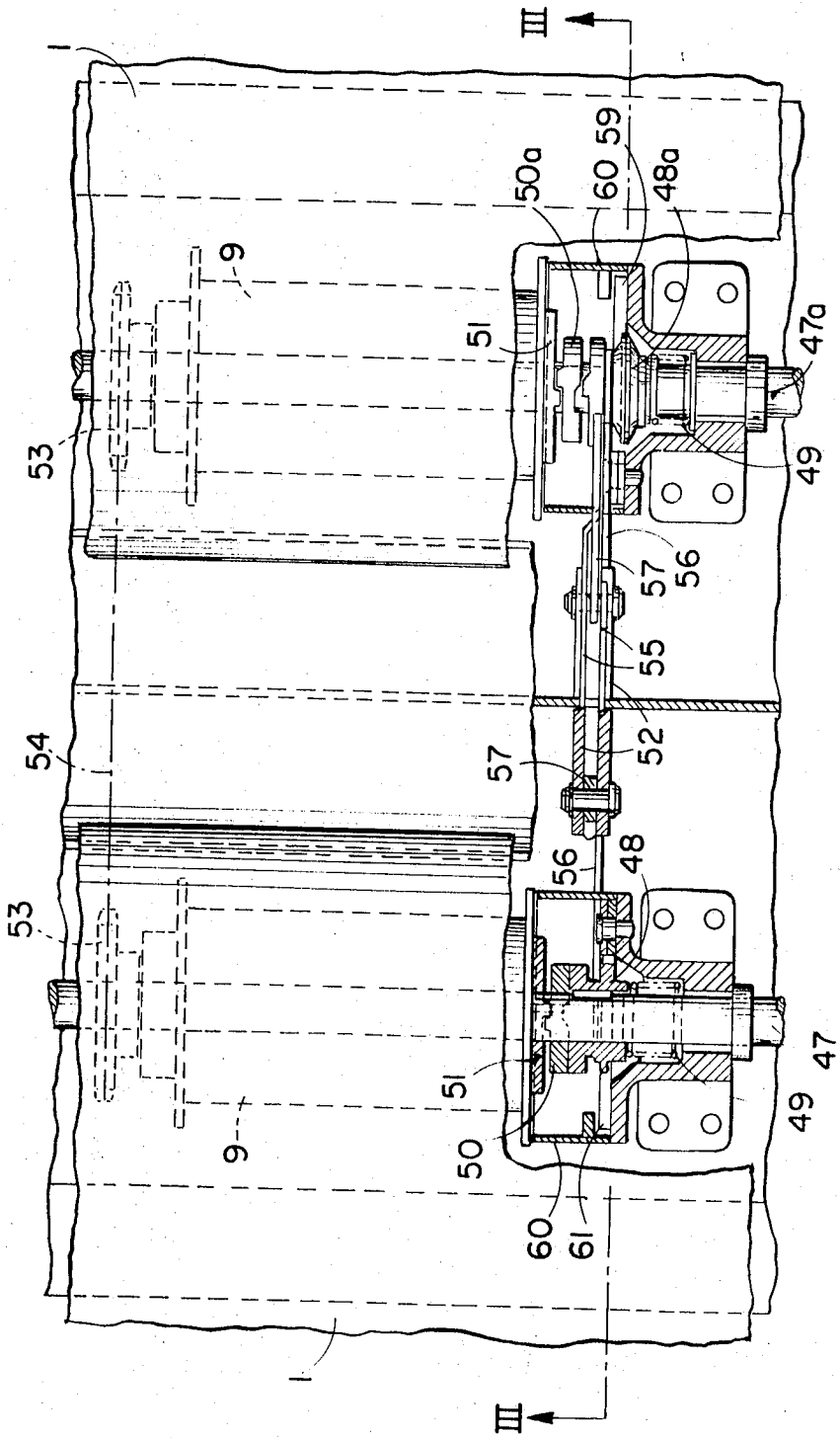
FIG. 4 is a top plan view, partly in section along the line IV—IV of FIG. 3, of the clutch device shown in FIG. 3.

In the embodiment of the invention shown in FIGS. 3 and 4, the sliding roof sections 1 also are connected to respective drums in the same manner as described in Pat. No. 3,526,194. The respective clutch devices for each sliding roof section are also mounted directly next to the associated drums and connected therewtih as a structural unit. The clutch device of FIGS. 3 and 4 also automatically connects the drum for opening the associated sliding roof section, in accordance with the direction of rotation of the manual crank, and automatically effectively uncouples the drum connected to the other sliding roof section.

To open, for example, the left sliding roof section 1 of FIGS. 3 and 4, the manual crank is moved in the direction indicated for such opening movement. Through the transmission linkage, shaft 47, on which are mounted the left drum 9 and the clutch device, is rotated. A clutch bushing 48, which is mounted on shaft 47 for axial displacement, is, when the left sliding roof section 1 is closed, pressed by a compression spring 49 against an intermediate clutch disk 50 and thus coupled to disk 50. On its surface toward lefthand drum 9, intermediate clutch disk 50 has a cam which bears against a cam on the facing surface of a clutch disk 51 secured to lefthand drum 9. Through intermediate clutch disk 50, clutch disk 51 and clutch bushing 48, the lefthand drum 9 is rotated and the connecting sliding roof section is opened.

The shafts 47 and 47a of the two opening devices for the sliding roof sections 1 are interconnected, for conjoint rotation, by sprockets 53 and chain 54. Thus, when the manual crank is rotated to open the left sliding roof section 1, for example, the shaft 47a associated with the right sliding roof section 1 is also rotated. As the cams of clutch bushing 48 and intermediate clutch 50a are sloped at one end, clutch bushing 48a is effectively disengaged from intermediate clutch disk 50 and is axially displaced against the bias of the associated compression spring 49. Shaft 47a consequently rotates in an idle manner, and is not connected to the righthand drum 9.

The two clutch devices are interconnected by articulated links 55 and 56 and bell cranks 57 which are pivotally mounted in web plates or ears 52 secured to cross connection 7 of the freight car. When the sliding roof sections 1 are closed, bell cranks 57 bear against the end roof cross members 11 under the tension of a spring 58.

If, for example, the left sliding roof section 1 is lifted, spring 58 swings lefthand bell crank 57 in a clockwise direction. The link 55 connected at one end to the lefthand bell crank 57 has its other end connected at an upper locking member 59 in the clutch housing 60 of the righthand roof section 1. Thus, as left angle lever 57 is swung clockwise by the tension of spring 58, this link 55 swings the righthand locking member 59 against shaft 47a, thus interposing a bevelled contact face of locking member 59 in front of a collar on clutch bushing 48a which, at this time, is disengaged and remains disengaged during rotation of shaft 47a.

The link 56 connected to the left bell crank 57 at one end, has its other end connected to a lower locking member 61 of the clutch device associated with the sliding roof section 1 which is to be opened. This link 56, by virtue of the clockwise pivoting of the left bell crank 57, pushes left locking member 61 against shaft 47 and behind the collar of clutch bushing 48. The clutch device associated with the left sliding roof section is thus locked in its engaged position and cannot become disengaged until the left sliding roof section 1 is dropped into its closed position so that its end cross member 11 engages the left bell crank 57 and swings it counterclockwise.

To close left sliding roof section 1, the direction of rotation of the manual crank is reversed. After overcoming of the idling motion caused by the arrangement of only one cam on the intermediate clutch disk 50 and the clutch disk 51, left sliding roof section 1 is closed by the rotation of drum 9 to which its cables are connected. This roof section descends into its starting position so that the end cross member 11 engages left bell crank 57 and moves this bell crank back into its starting position. In turn, this effects disengagement of locking members 59 and 61 through the links 55 and 56 connected to left bell crank 57. Thereby, clutch bushing 48a of the non-actuated right sliding roof section 1 is again free to engage its intermediate clutch disk 50a.

Figure 5:
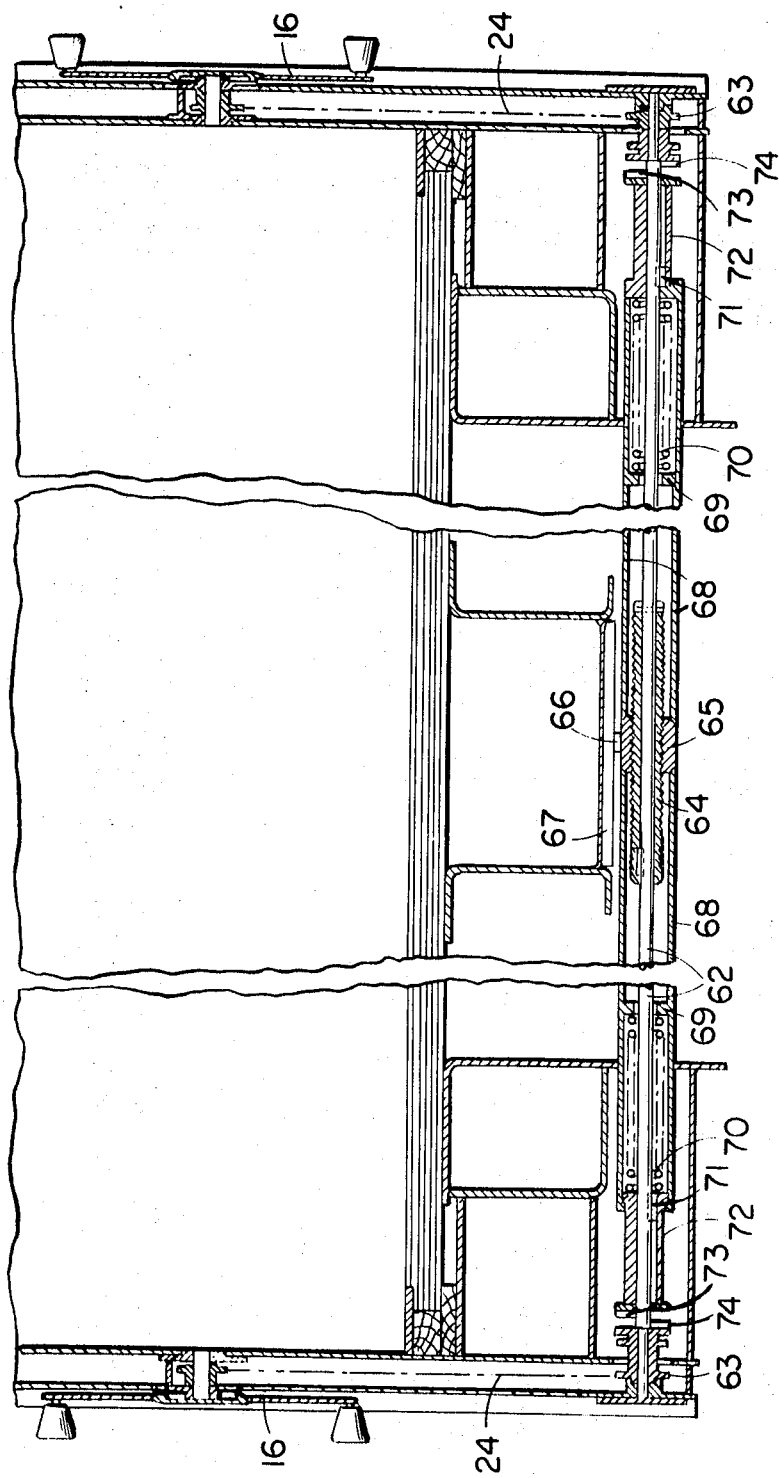
FIG. 5 is a longitudinal or axial sectional view through a third embodiment of the clutch device in accordance with the invention.

In the embodiment of the invention shown in FIG. 5, the sliding roof sections are also opened by rotation of a drum, in the manner described in U.S. Pat. No. 3,526,194. In this embodiment of the invention, the clutch device is mounted beneath the car body in the underframe, and is connected to the transmission elements of both sliding roof sections. As described in such patent, hand cranks 16 are disposed on each side of the freight car, and the actual roof opening devices are actuated through transmission means.

In FIG. 5, the transmission means comprise chains 24 engaged with sprockets 63 on a shaft 62 arranged in the underframe of the car and extending normal to the longitudinal axis of the car. Shaft 62 has a threaded part 64 with which there is engaged a nut 65 mounted at about the longitudinal center of the car and movable to either side, nut 66 being restrained against rotation by a nose 66 engaged in a corresponding guide 67 in the underframe. At each opposite end, nut 65 is extended by tubes 68, and each tube 68 contains a compression spring 70 abutting a fixed collar 69. At the outer ends of tubes 68, there are slide bushings 72 which are restrained to rotate with shaft 62, while being axially displaceable therealong, by spring keys 71. These bushings are biased outwardly by the compression springs 70 engaged with the collars 69 of the tubes.

When shaft 62 is rotated, by way of a hand crank 16, chain 24 and sprocket wheel 63, nut 65, tubes 68 and slide bushings 72 move axially of shaft 62 toward one longer side of the freight car. Cam 73 on the slide bushing 72 which move toward this side of the freight car, engages cam 74 at the sprocket wheel 63. Through the transmission elements connected to sprocket wheel 63, the corresponding slidable roof section is moved. The path of compression springs 70 and the range of possible displacement of nuts 65 and tubes 68 on threaded parts 64, or, respectively, the path of slide bushing 72, are so proportioned that they correspond proportionally to the path of the sliding roof section.

To close the opened sliding roof section, the direction of rotation of hand crank 16 is reversed. Nut 65 now moves in the opposite direction so that cam 73 of slide bushings 72 is disengaged from cam 74 of sprocket 63, when the sliding roof section reaches its descent or lowering position. With both sliding roof sections closed, both slide bushings 72 are uncoupled from the associated sprockets 63.

What is claimed is:

1. In a device for opening and closing sliding roof sections of containers, such as two-section roofs of freight cars, of the type in which each roof section is connected by two cables to a drum rotatably mounted on a cross connection of the car, with each cable connected to the roof section adjacent a respective end of the latter and the two cables being wound in opposed directions on the associated drum, manually operable crank means, and transmission means connecting the crank means to the drums: the improvement comprising, in combination, respective clutch means interposed between each drum and said transmission means; and clutch operating means connecting said crank means to said clutch means and operable, responsive to operation of said crank means in a direction to open one roof section, to engage the clutch means connecting the associated drum to said transmission means and to disengage, and maintain disengaged, the clutch means interposed between the other drum and said transmission means.

2. In a device for opening and closing sliding roof sections, the improvement claimed in claim 1, in which said clutch operating means is effective to engage one clutch means and to disengage the other clutch means only when the sliding roof sections are closed.

3. In a device for opening and closing sliding roof sections, the improvement claimed in claim 1, in which said clutch operating means maintains engaged the clutch means connecting the associated drum to said transmission means to open one roof section until said one roof section has been returned to the closed position by reverse operation of said crank means.

4. In a device for opening and closing sliding roof sections, and in which, during opening movement of a roof section, the roof section is initially lifted and then moved longitudinally and, during closing movement of a roof section, the roof section is initially moved longitudinally to the closed position and then lowered, the improvement claimed in claim 1, in which said clutch operating means includes an idling connection effective during lowering of a roof section after closing thereof.

5. In a device or opening and closing sliding roof sections, the improvement claimed in claim 1, in which said clutch operating means is common to both sliding roof sections.

6. In a device for opening and closing sliding roof sections, the improvement claimed in claim 1, in which respective clutch operating means are provided for each sliding roof section.

7. In a device for opening and closing sliding roof sections, the improvement claimed in claim 6, including transmission means interconnecting the respective clutch operating means for conjoint and synchronized operation.

8. In a device for opening and closing sliding roof sections, the improvement claimed in claim 1, in which said clutch operating means comprises at least one shaft rotatable by said crank means and having a threaded portion; and a respective nut engaged with each threaded portion and secured against rotation whereby, upon rotation of a shaft, said nut is displaced axially therealong; said nut operating said clutch means.

9. In a device for opening and closing sliding roof sections, the improvement claimed in claim 1, in which said clutch operating means comprises interengageable cams on facing clutch disks, said cams being constructed for positive driving engagement upon rotation of a driving clutch disk in one direction and for relative slippage upon rotation of the driving clutch disk in the opposite direction; and means biasing said clutch disks in a direction to interengage said cams.

References Cited
UNITED STATES PATENTS

| | | | |
|---|---|---|---|
| 860,518 | 7/1907 | Best | 49—136 |
| 970,526 | 9/1910 | Mawdsley | 49—136 |
| 1,099,361 | 6/1914 | Hartland | 105—377 |
| 1,229,234 | 6/1917 | Coogle | 49—136 |
| 1,254,696 | 1/1918 | Jenkins | 49—136 |
| 1,258,314 | 3/1918 | Bruce | 105—377 |
| 1,274,732 | 8/1918 | McRae | 105—377 X |
| 1,274,789 | 8/1918 | Schedlbauer | 105—377 |
| 2,614,836 | 10/1952 | Williams | 49—136 X |

DENNIS L. TAYLOR, Primary Examiner

U.S. Cl. X.R.

105—377